(12) United States Patent
Diwan

(10) Patent No.: US 8,189,503 B2
(45) Date of Patent: May 29, 2012

(54) SYSTEMS AND METHODS FOR PACKAGING AND DISTRIBUTING INFORMATION

(75) Inventor: Arif Diwan, Cranston, RI (US)

(73) Assignee: Stragent, LLC, Longview, TX (US)

( * ) Notice: Subject to any disclaimer, the term of this patent is extended or adjusted under 35 U.S.C. 154(b) by 0 days.

(21) Appl. No.: 12/699,850

(22) Filed: Feb. 3, 2010

(65) Prior Publication Data

US 2010/0150050 A1    Jun. 17, 2010

Related U.S. Application Data

(63) Continuation of application No. 10/929,146, filed on Aug. 27, 2004, which is a continuation of application No. 09/545,439, filed on Apr. 7, 2000, now Pat. No. 6,801,936.

(51) Int. Cl.
*H04H 20/71* (2008.01)

(52) U.S. Cl. ........................................................ 370/312

(58) Field of Classification Search ............... 709/219; 370/312
See application file for complete search history.

(56) References Cited

U.S. PATENT DOCUMENTS

| | | | |
|---|---|---|---|
| 4,002,842 A | 1/1977 | Meyr | 179/15 |
| 4,090,035 A | 5/1978 | Popkin | 179/15 |
| 4,199,663 A | 4/1980 | Herzog | 370/85 |
| 4,471,481 A | 9/1984 | Shaw et al. | 370/85 |
| 4,562,573 A | 12/1985 | Murano et al. | 370/85 |
| 4,698,804 A | 10/1987 | Flores et al. | 370/86 |
| 4,727,370 A | 2/1988 | Shih | 340/825 |
| 5,155,727 A | 10/1992 | Bonup et al. | 370/85.3 |
| 5,673,430 A | 9/1997 | Story | 455/4.2 |
| 5,758,257 A * | 5/1998 | Herz et al. | 725/116 |
| 5,819,284 A | 10/1998 | Farber et al. | 707/104 |
| 5,838,252 A | 11/1998 | Kikinis | 340/825.44 |
| 5,838,912 A | 11/1998 | Poon et al. | 395/200.34 |
| 5,893,091 A | 4/1999 | Hunt et al. | 707/3 |
| 5,936,547 A | 8/1999 | Lund | 340/825.44 |
| 5,974,447 A | 10/1999 | Cannon et al. | 709/206 |
| 6,021,433 A | 2/2000 | Payne et al. | 709/219 |
| 6,029,195 A | 2/2000 | Herz | 709/219 |
| 6,088,722 A | 7/2000 | Herz et al. | 709/217 |
| 6,202,062 B1 | 3/2001 | Cameron et al. | 703/3 |

(Continued)

FOREIGN PATENT DOCUMENTS

EP    0094660    11/1983

(Continued)

OTHER PUBLICATIONS

Office Action Summary from U.S. Appl. No. 10/929,146 mailed on Feb. 23, 2009.

(Continued)

*Primary Examiner* — Hussein A. Elchanti
*Assistant Examiner* — Maceeh Anwari
(74) *Attorney, Agent, or Firm* — Patrick E. Caldwell, Esq.; The Caldwell Firm, LLC

(57) ABSTRACT

A system (190) provides information to multiple subscribers (105-125). The system (190) receives requests for different types of information from the subscribers (105-125) and stores rules for delivering the requested information. The system (190) gathers information from multiple information sources (145-155), packages at least some of the gathered information into customized bundles according to the received requests and the stored rules, and delivers the customized bundles to the subscribers (105-125) according to the stored rules.

100 Claims, 5 Drawing Sheets

U.S. PATENT DOCUMENTS

| | | | | |
|---|---|---|---|---|
| 6,230,205 | B1 | 5/2001 | Garrity et al. | 709/231 |
| 6,236,991 | B1 | 5/2001 | Frauenhofer et al. | 707/6 |
| 6,237,022 | B1 | 5/2001 | Bruck et al. | 709/201 |
| 6,243,757 | B1 | 6/2001 | Kanodia et al. | 709/235 |
| 6,308,175 | B1 | 10/2001 | Lang et al. | 707/10 |
| 6,317,783 | B1 | 11/2001 | Freishtat et al. | 709/218 |
| 6,359,902 | B1 | 3/2002 | Putzolu | 370/466 |
| 6,442,598 | B1 | 8/2002 | Wright et al. | 709/217 |
| 6,486,892 | B1 | 11/2002 | Stern | 345/760 |
| 6,546,488 | B2 | 4/2003 | Dillon et al. | 713/181 |
| 6,594,682 | B2 | 7/2003 | Peterson et al. | 709/102 |
| 6,594,692 | B1 | 7/2003 | Reisman | 709/219 |
| 6,745,333 | B1 | 6/2004 | Thomsen | 713/201 |
| 6,801,946 | B1 | 10/2004 | Child et al. | 709/230 |
| 7,523,167 | B2 * | 4/2009 | Thomas et al. | 709/206 |
| 2001/0003828 | A1 | 6/2001 | Peterson et al. | 709/219 |
| 2001/0034658 | A1 | 10/2001 | Silva et al. | 705/26 |
| 2003/0115319 | A1 | 6/2003 | Dawson et al. | 709/224 |
| 2005/0132219 | A1 | 6/2005 | Robert | 713/201 |
| 2005/0283613 | A1 | 12/2005 | Carpentier et al. | 713/180 |

FOREIGN PATENT DOCUMENTS

| | | |
|---|---|---|
| EP | 0094660 | 11/1993 |
| WO | WO 97/48051 | 12/1997 |
| WO | WO9748051 | 12/1997 |

OTHER PUBLICATIONS

Final Office Action Summary from U.S. Appl. No. 10/929,146 mailed on Feb. 15, 2010.

Aether Technologies, Enterprise Data Wireless Center: Feb. 1999, 15 pages.

Aether, "Mobeo Products," www.Mobeo.com/product/html. Jan. 28, 2000 (print date). 3 pages.

Baynetworks, "Exploiting Internetwork Multicast Services." www.baynetworks.com/products/reports/multicast.html, Jul. 29, 1999 (print date), 22 pages.

EntryPoint, "EntryPoint: The Internet Toolbar that really delivers," www.entrypoint.com, Jan. 26, 2000 (print date), 4 pages.

Netscape, Netcenter, www.netcenter.com, Jan. 26, 2000 (print pages), 2 pages.

Office Action issued Oct. 23, 2007 for U.S. Appl. No. 11/042,291.

PointCast, Enterprise Solutions, pioneer.pointcast.com/products/server, Jan. 26, 2000 (print date), 4 pages.

R. Ramanathan, "RFC2102," www.faqs/org/rfcs/rfc2122.html, Feb. 1997, 16 pages.

StarBurst Communications, "StarBurst Allowed Patent Application on Multicast Technology that has Potential Break Looming Internet Logjam." www.starburstcom.com/prpatent.htm, Jul. 29, 1996, 3 pages.

WebCanal, "Global Information Broadcast," monet.inria.fr/white/index.html, Dec. 31, 1997, 9 pages.

Office Action from U.S. Appl. No. 09/545,439 which was mailed on Jun. 25, 2001.

Office Action from U.S. Appl. No. 09/545,439 which was mailed on Dec. 12, 2001.

Office Action from U.S. Appl. No. 09/545,439 which was mailed on Jan. 21, 2003.

Office Action from U.S. Appl. No. 09/545,439 which was mailed on Jun. 13, 2003.

Office Action from U.S. Appl. No. 09/545,439 which was mailed on Aug. 21, 2003.

Office Action from U.S. Appl. No. 09/545,439 which was mailed on Oct. 27, 2003.

Appeal Brief from U.S. Appl. No. 09/545,439, filed on Apr. 19, 2004.

Notice of allowance from U.S. Appl. No. 09/545,439 which was mailed on Jun. 1, 2004.

Office Action from U.S. Appl. No. 10/929,146 which was mailed on Mar. 23, 2010.

Office Action from U.S. Appl. No. 10/929,146 which was mailed on Sep. 16, 2010.

Office Action from U.S. Appl. No. 10/929,146 which was mailed on May 24, 2011.

Office Action from U.S. Appl. No. 12/699,853 which was mailed on Sep. 17, 2010.

Office Action from U.S. Appl. No. 12/699,853 which was mailed on May 19, 2011.

U.S. Appl. No. 09/545,439, filed Apr. 7, 2000.

U.S. Appl. No. 10/929,146, filed Aug. 27, 2004.

U.S. Appl. No. 12/699,853, filed Feb. 3, 2010.

* cited by examiner ately monitor the network for broadcast messages from the identified information providers. These conventional systems do not permit the user to customize the delivery of the information.

SYSTEMS AND METHODS FOR PACKAGING AND DISTRIBUTING INFORMATION

CROSS-RELATED APPLICATION

The present application is a continuation of U.S. application Ser. No. 09/545,439, filed Apr. 7, 2000, the specification of which is incorporated herein by reference in its entirety.

BACKGROUND OF THE INVENTION

A. Field of the Invention

The present invention relates generally to information distribution systems and, more particularly, to systems and methods that facilitate the distribution of information from various sources to multiple subscribers.

B. Description of Related Art

Over the last decade, networks, such as the Internet, have expanded by many orders of magnitude. The types of information provided over these networks have also increased and now include streaming audio, video, multi-player network interactive games, and other multimedia information. With the vast amount of information available, it has become extremely important to distribute the information in as efficient and economical a manner as possible, especially at the edges of the networks, where mobile nodes may tie into wireless networks.

Some conventional systems use broadcast technology to distribute information. Broadcasting permits information providers to send a single message that is replicated and transmitted across a network. If a user desires information from one or more broadcast streams, the user needs to identify the information providers that supply the information and constantly monitor the network for broadcast messages from the identified information providers. These conventional systems do not permit the user to customize the delivery of the information.

Other conventional systems use multicast technology to distribute information. Multicasting permits information providers to send a single message that is replicated and transmitted to hundreds and thousands of subscribers across a network. If a user desires information in this case, the user must determine what information providers supply the desired information and subscribe to their information delivery services. It is not always easy, however, to find these information providers and once they are found, they may not permit the user to customize the delivery of the information.

As a result, a need exists for a system that facilitates the information request process and permits users to customize the types of information they receive.

SUMMARY OF THE INVENTION

Systems and methods consistent with the present invention address this need by providing at least one agent that gathers information from multiple sources, packages the information into customized bundles, and delivers the bundles to subscribers according to a set of rules using multicast routing techniques.

In accordance with the purpose of the invention as embodied and broadly described herein, a system provides information to multiple subscribers. The system receives requests for different types of information from the subscribers and stores rules for delivering the requested information. The system gathers information from multiple information sources, packages at least some of the gathered information into customized bundles according to the received requests and the stored rules, and delivers the customized bundles to the subscribers according to the stored rules.

In another implementation consistent with the present invention, an agent connects to at least one information source and at least one subscriber. The agent includes a memory and a processor. The memory stores instructions. The processor executes the instructions in the memory to collect different types of information from the information sources, package at least some of the collected information into bundles based on preferences of the subscribers, generate multicast messages containing the bundles, and transmit the multicast messages to appropriate ones of the subscribers.

In a further implantation consistent with the present invention, a method for delivering information includes receiving requests for different types of information from multiple subscribers; collecting information from multiple information sources over a network; identifying parts of the collected information common to the requests of a group of the subscribers; generating a multicast message containing the common information; and transmitting the multicast message to the group of subscribers.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention efficiently and economically distribute information from multiple sources to multiple subscribers. The systems and methods gather information from the sources, package them into customized bundles according to requests and rules defined by the subscribers and/or agent managers, and transmit the bundles to the subscribers based on the rules using Internet protocol (IP) multicast routing techniques. IP multicast, coupled with multicast routing techniques, provides a powerful mechanism by which to distribute information to a very large number of subscribers from a single source.

Exemplary Network

Figure 1:
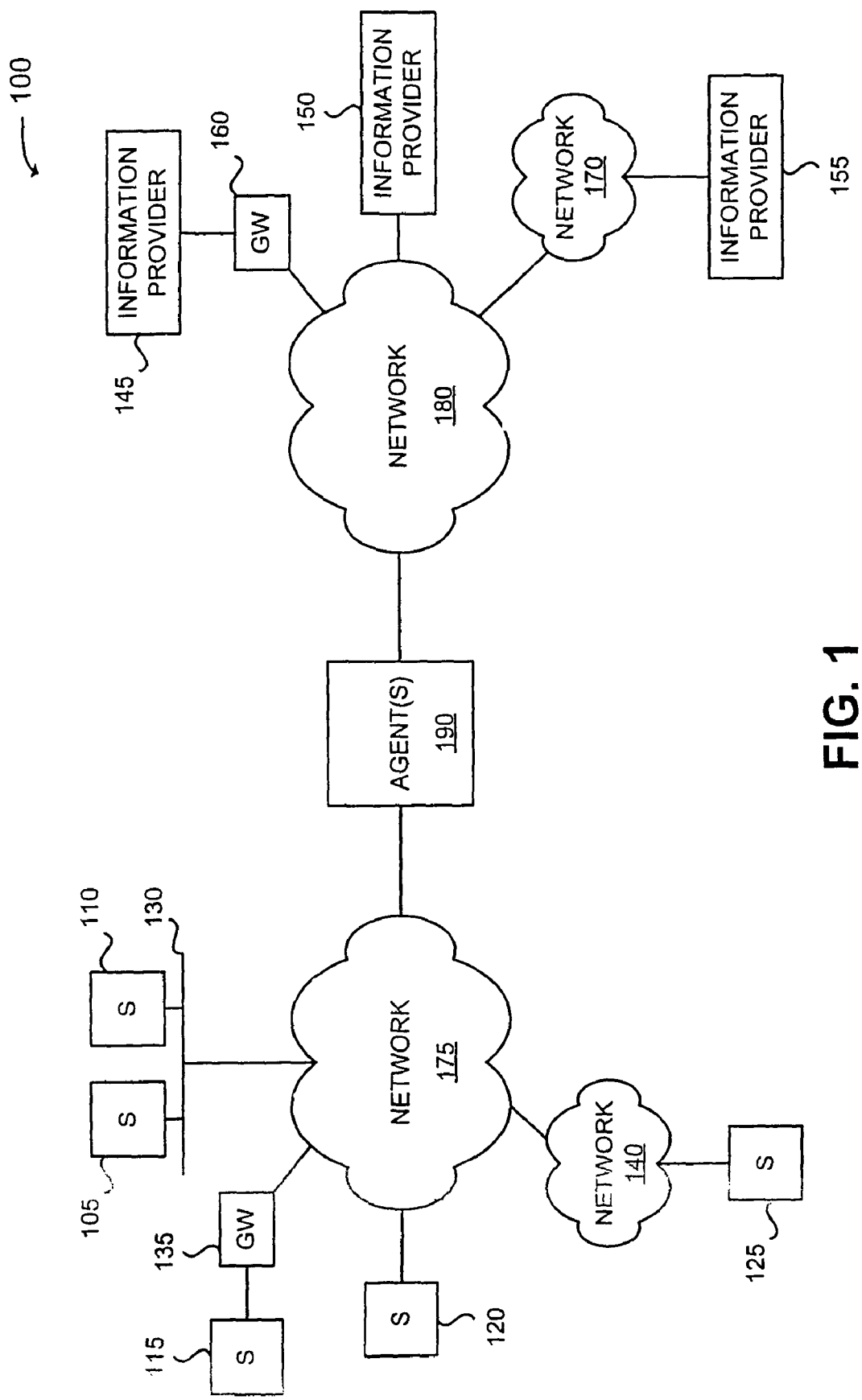
FIG. 1 is a diagram of an exemplary network in which systems and methods consistent with the present invention may be implemented.

FIG. 1 is a diagram of an exemplary network 100 in which systems and methods consistent with the present invention may be implemented. The network 100 may include multiple subscribers 105-125 and multiple information providers 145-155 connected via networks 175 and 180, respectively, to one or more agents 190. The networks 175 and 180 may include the Internet, an intranet, a wide area network (WAN), a metropolitan area network (MAN), a local area network (LAN), a public telephone network, such as the public switched telephone network (PSTN), or a similar network. In addition the networks 175 and 180 may comprise a single network or separate networks. such as the public switched telephone network.

The subscribers 105-125 may include any combination of personal computers, personal digital assistants (PDAs), laptop, mobile or portable telephones, and similar communication devices that request information supplied by one or more of the information providers 145-155. The subscribers 105-125 may connect to the network 175 in several different ways, including wired, wireless, and optical connections. For example, subscribers 105 and 110 connect to the network 175 via a LAN 130; subscriber 115 connects to the network 175 via a conventional gateway 135; subscriber 120 connects to the network 175 via a wired, wireless, or optical connection; and subscriber 125 connects to the network 175 via a separate network 140 that may include the Internet, an intranet, a WAN, a LAN, etc. Five subscribers have been shown in FIG. 1 for simplicity. Additional subscribers may also be included in the network 100.

The information providers 145-155 may include servers, personal computers, laptops, or similar devices that supply information to whomever wants it and/or subscribes to the service. The information providers 145-155 may broadcast streams of information onto the network 180. One example of an information provider may include a news web site, such as NBC.com, that broadcasts streams of news information.

Alternatively, the information providers 145-155 may transmit multicast messages containing information. In this case, the information providers 145-155 may receive requests for information according to any conventional protocol, such as the hyper text transfer protocol (HTTP), the simple mail transfer protocol (SMTP), the network virtual terminal protocol (Telnet), and the like. In response to the requests, the information providers 145-155 may generate multicast messages that include the requested information, such as stock quotes, weather or sports reports, etc., and transmit them using conventional multicast routing techniques. One example of an information provider may include the web site Weather.com that provides up-to-date weather reports to its subscribers.

To accomplish the broadcast or multicast transmissions, the information providers 145-155 may connect to the network 180 in a number of different ways, including wired, wireless, and optical connections. For example, information provider 145 connects to the network 180 via a conventional gateway 160; information provider 150 connects to the network 180 via a wired, wireless or optical connection; and information provider 155 connects to the network 180 via a separate network 170 that may include the Internet, an intranet, a WAN, a LAN, etc. Three information providers have been shown in FIG. 1 for simplicity. Additional information providers may also be included in the network 100.

Figure 2:
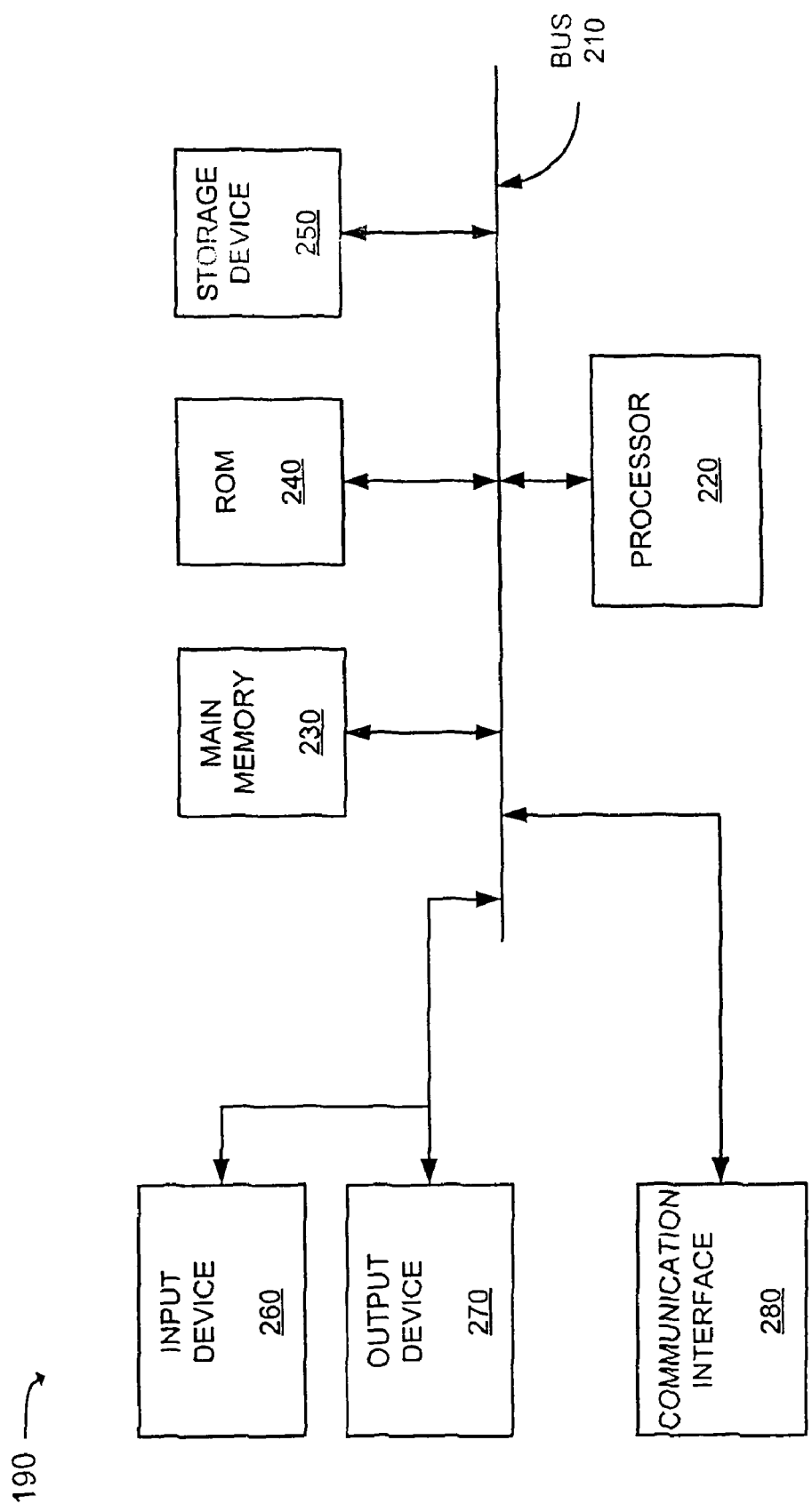
FIG. 2 is a detailed diagram of an agent in the network of FIG. 1.

The agent(s) 190 take requests from the subscribers 105-125 for supplying them with information supplied by the information providers 145-155. FIG. 2 is an exemplary diagram of an agent 190 in one implementation consistent with the present invention. In this implementation, the agent 190 is a stand-alone device. In other implementations, the agent 190 may be a virtual entity whose functions are distributed over several devices or implemented as software within a single device, such as network router.

The agent 190 may include a bus 210, a processor 220, a main memory 230, a read only memory (ROM) 240, a storage device 250, an input device 260, an output device 270, and a communication interface 280. The bus 210 permits communication among the components of the agent 190.

The processor 220 may include any type of conventional processor or microprocessor that interprets and executes instructions. The main memory 230 may include a random access memory (RAM) or another dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include any conventional mechanism that permits an operator to input information to the agent 190, such as a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the agent 190 to communicate with other devices and/or systems. For example, the communication interface 280 may include mechanisms for communicating with another device or system via a network, such as networks 175 and 180.

As will be described in detail below, an agent 190, consistent with the present invention, repackages information from information providers into customized bundles and provides the bundles to subscribers in accordance with a set of rules using, for example, IP multicast routing techniques. The agent 190 performs these tasks in response to the processor 220 executing sequences of instructions contained in, for example, memory 230. These instructions may be read into memory 230 from another computer-readable medium, such as the storage device 250, or from another device via the communication interface 280.

Execution of the sequences of instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Subscriber Database

Figure 3:
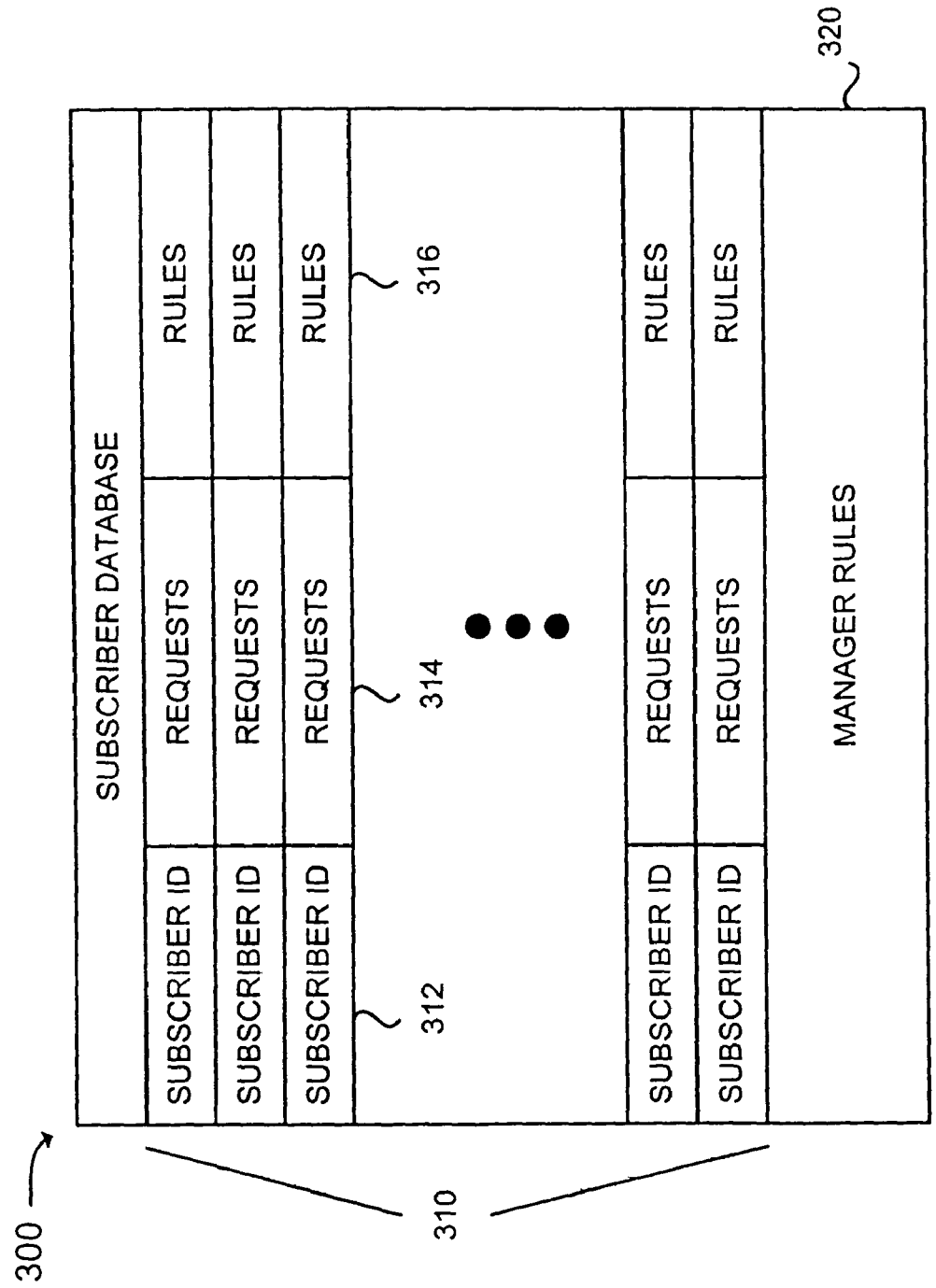
FIG. 3 is an exemplary diagram of a subscriber database in the agent of FIG. 2.

The agent 190 may store a subscriber database that controls packaging and distribution operations performed by the agent 190. FIG. 3 is an exemplary diagram of a subscriber database 300 consistent with the present invention. The subscriber database 300 may physically reside in the storage device 250 or main memory 230 of the agent 190 or may be stored in an external memory device accessible by the agent 190 via the communication interface 280.

The subscriber database 300 may include multiple entries 310, corresponding to multiple subscribers, and manager rules 320. Each of the entries 310 may include a subscriber identifier field 312, a requests field 314, and a rules field 316. The subscriber identifier field 312 may store a unique identifier for a particular subscriber or group of subscribers.

The requests field 314 may store information that indicates the types of information that the subscriber(s) identified in the corresponding subscriber identifier field 312 desires. The requests field 314 may include, for example, requests for stock quotes, current weather conditions, sports scores, news headlines, etc. The requests may be general or specific in nature. For example, a subscriber might request stock quotes for GTE stock, weather conditions for Boston, NBA scores, and all news headlines concerning Fortune 500 companies.

The rules field 316 may store rules that control the manner in which the agent 190 bundles and distributes the information it receives from the information providers. The rules might specify whether the subscriber wants the agent 190 to always complete a bundle or to fulfill partial orders (i.e., a bundle that includes a portion, but not all, of the information requested by the subscriber), the intervals at which the bundles must be released to subscriber, the form that the subscriber wants the bundle delivered (e.g., in text or audio format), etc.

The manager rules 320 include rules established by an agent manager. The agent manager may be a person or system that establishes a set of "ground rules" for the agent 190 to help the agent 190 operate in an efficient and economical manner. These rules might specify whether to form unions and intersections of requests to generate bundles of optimal size that will satisfy the requests of several subscribers, and whether to generate bundles with less and/or more information than the subscribers request.

Processing for Registering a Subscriber

Figure 4:
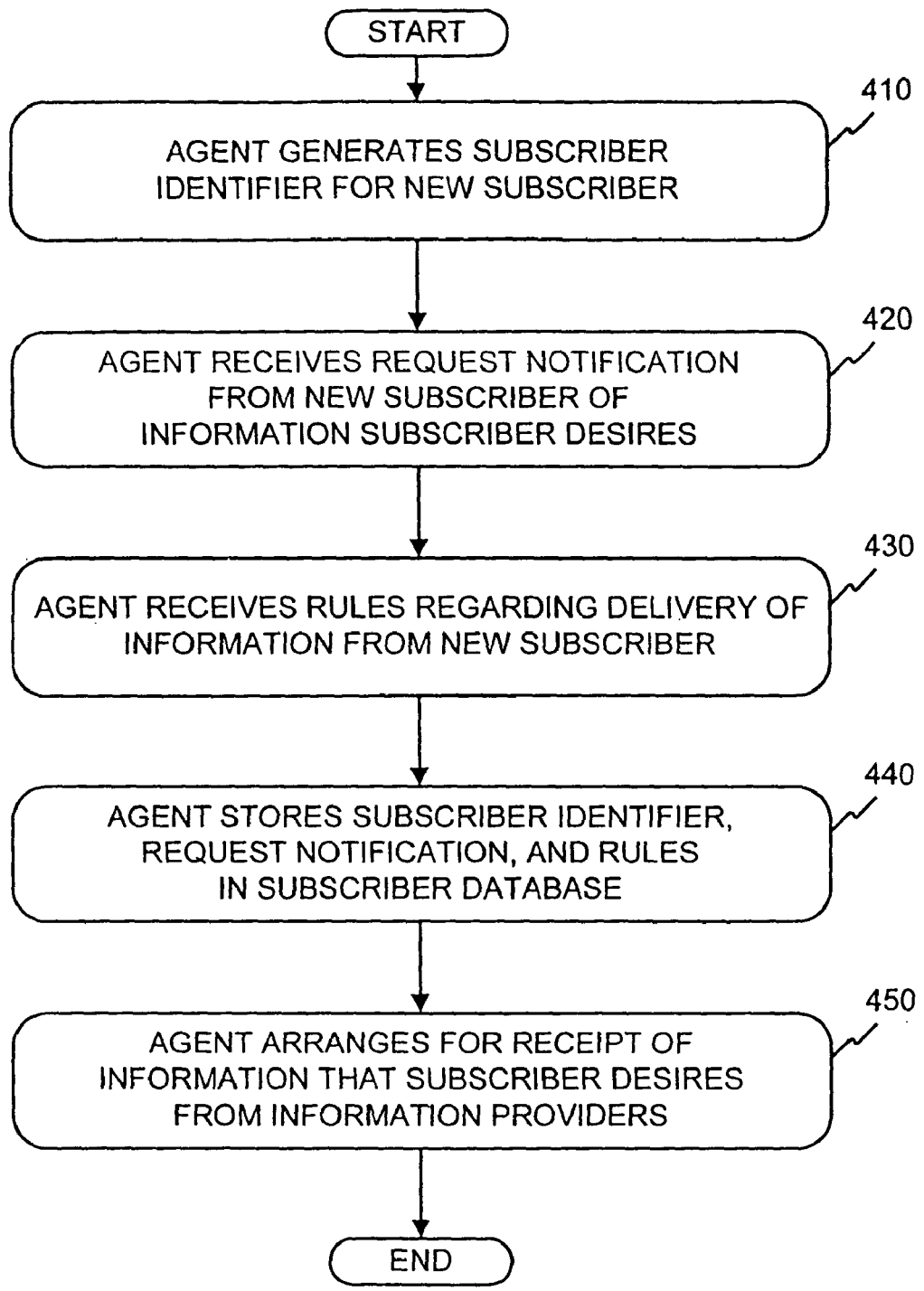
FIG. 4 is a flowchart of processing for registering with an agent to receive customized bundles of information.

FIG. 4 is a flowchart of processing for registering with an agent to receive customized bundles of information. When a subscriber desires to register with an agent, such as agent 190, the subscriber contacts the agent 190 in a conventional manner. For example, the subscriber may access a web site of the agent 190 via a network, such as the Internet, contact the agent 190 via a data or voice connection, email the agent 190, or establish contact with the agent 190 via other mechanisms. Once the subscriber contacts the agent 190, the agent 190 may generate a subscriber identifier for the new subscriber [step 410]. The agent 190 may automatically generate a numeric or alphanumeric identifier for the subscriber or may permit the subscriber to provide an identifier.

The agent 190 prompts the subscriber for the type(s) of information that the subscriber desires to receive. For example, the agent 190 may present the subscriber with a list of available information services and permit the subscriber to select from the list. Alternatively, the agent 190 may permit the subscriber to specify the information services that the subscriber desires without presenting the subscriber with a list. In any event, the agent 190 receives a request notification (i.e., a selection) from the subscriber indicating the information services that the subscriber desires [step 420].

The agent 190 prompts the subscriber for delivery rules that indicate the manner in which the subscriber wants the information delivered. For example, the subscriber might specify that the information must be delivered by 5:00 PM each day, whether the subscriber wants all of the information or will accept some of it, etc. The subscriber provides the rules to the agent 190 [step 430]. The agent 190 then stores the subscriber identifier, request notification, and rules in the appropriate fields of an entry 310 in the subscriber database 300 [step 440].

If the subscriber requests information that the agent 190 does not already obtain for another subscriber, the agent 190 may identify the information provider that broadcasts the information and arrange to receive the broadcast stream [step 450]. Alternatively, the agent 190 may request delivery of the information from an information provider [step 450]. In this case, the agent 190 may obtain a multicast group identification (ID) address from the information provider for use by the agent 190 in receiving the information provided by the information provider. The agent 190 then begins listening for information form information providers using one or more multicast group ID addresses.

Processing for Packaging and Distributing Information

Figure 5:
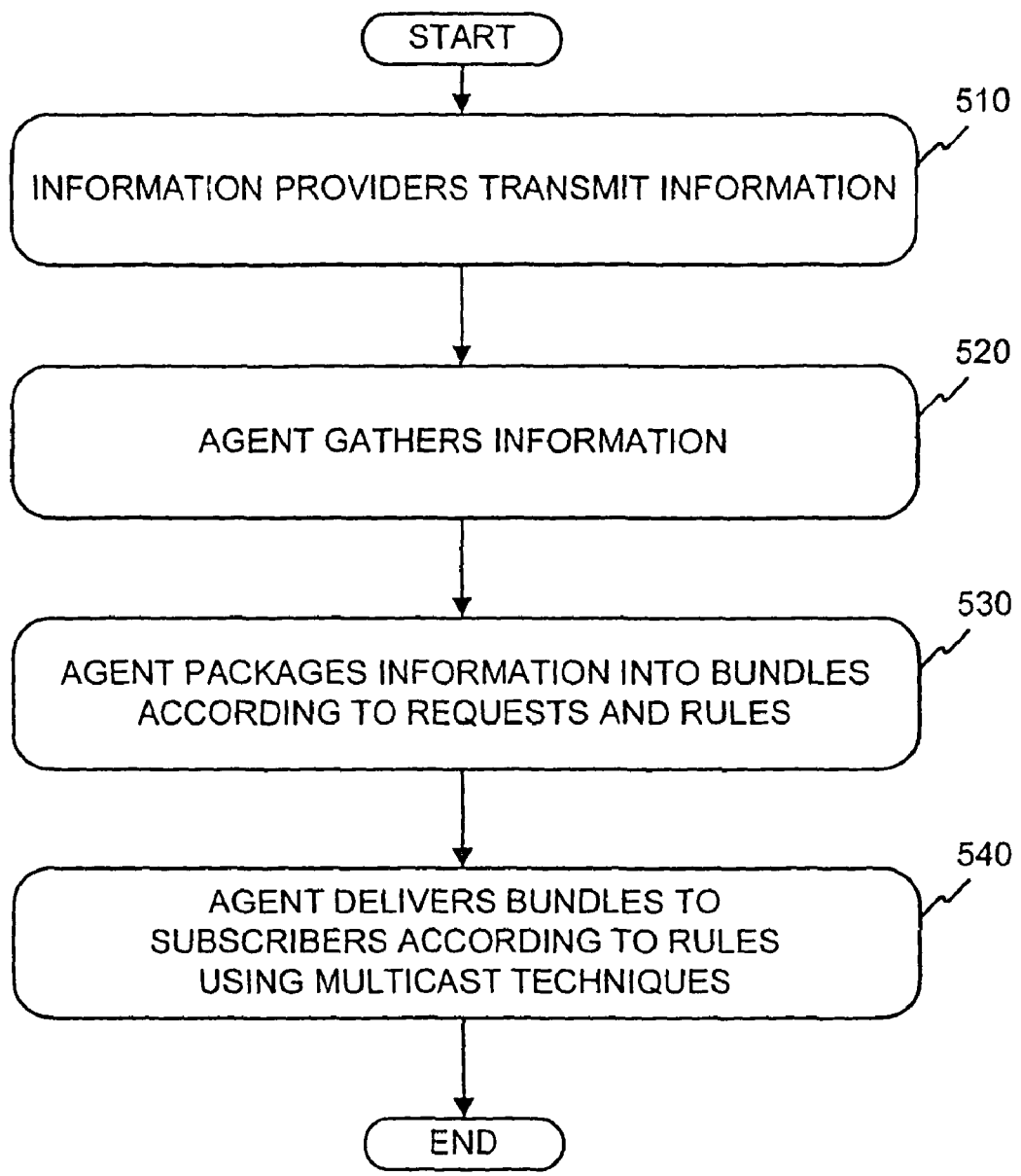
FIG. 5 is a flowchart of processing for packaging and distributing information to subscribers.

FIG. 5 is a flowchart of processing for packaging and distributing information to subscribers. In their usual course of business, information providers transmit information, such as stock quotes, sports scores, etc., onto the network 180 [step 510]. The information providers may transmit the information using broadcast or multicast techniques. Members of a multicast group are identified by a common multicast group ID address. The agent 190 listens for the broadcast streams and, using its multicast group ID addresses, the multicast messages to select the information its subscribers desire [step 520].

Based on the requests and rules stored in its subscriber database 300, the agent 190 packages the messages into customized bundles [step 530]. The requests might indicate, for example, that a particular subscriber wants to receive stock quotes for GTE stock and sports scores relating to NBA games. The rules might dictate that the agent 190 form unions and intersections of subscriber requests to generate bundles of optimal size. These bundles might actually contain more or less information than desired by the particular subscribers. In the case where the bundles contain more information, software used by the subscribers may discard the extraneous information.

Once the bundles of information have been generated, the agent 190 distributes them to the subscribers [step 540]. The agent 190 may use IP multicast techniques to distribute a bundle to all of the subscribers requesting the information. The subscriber receives the information, possibly using a multicast group ID address, discards any extraneous information, and provides the requested information to a user. For example, the subscriber may present the requested information to the user as scrolling text in a pop-up window on a display.

CONCLUSION

Systems and methods consistent with the present invention improve the deliver of information from multiple sources by providing one or more agents that receive the information from the sources, package the information into customized bundles, and deliver the bundles according to a set of rules using multicast routing techniques.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the agent 190 has been described as passively listening for multicast messages from information providers. In another implementation consistent with the present invention, the agent 190 actively gets the desired information by accessing web sites, for example, of the information providers.

In yet another implementation consistent with the present invention, the subscribers subscribe to various information services provided by the information providers. The information providers provide the subscribers with multicast group ID addresses. The subscribers, in turn provide the group ID addresses to the agent 190. The agent 190, thereafter, intercepts messages from the information providers intended for the subscribers and bundles the information for them.

The scope of the invention is defined by the claims and their equivalents.

What is claimed is:

1. A computer program product embodied on a non-transitory computer-readable medium for delivering information, comprising:

computer code to cause at least one list of information services to be provided that are capable of supplying different information;

computer code to allow receipt of a selection of one or more of the information services from the at least one list;

computer code to allow receipt of requests for the different information from a plurality of subscriber devices;

computer code to allow receipt of a first subscriber request for a first plurality of messages associated with textual data associated with a first information source, from at least one of the plurality of subscriber devices, the textual data including at least one of stock quote information, weather information, or sports information;

computer code to allow receipt of a second subscriber request for a second plurality of messages associated with video data associated with a second information source, from at least one of the plurality of subscriber devices;

computer code to allow receipt of a third subscriber request for a third plurality of messages associated with audio data associated with a third information source, from at least one of the plurality of subscriber devices;

computer code to allow receipt of a first rule that is related to a time of delivery of information, utilizing at least one of the plurality of subscriber devices;

computer code to allow receipt of a second rule that is related to a form of delivery of information, utilizing at least one of the plurality of subscriber devices;

computer code to allow receipt of a third rule that is related to a presentation of information, utilizing at least one of the plurality of subscriber devices;

computer code to cause storage of:
        a plurality of subscriber identifiers;
        the first subscriber request for textual data;
        the second subscriber request for video data;
        the third subscriber request for audio data;
        a plurality of subscriber rules including:
            the first rule that is related to the time of delivery of information,
            the second rule that is related to the form of delivery of information, and
            the third rule that is related to a presentation of information; and
        a plurality of manager rules that is related to an optimization of a satisfaction of multiple requests from more than one of the plurality of subscriber devices;

computer code to cause, in response to the first subscriber request, transmission of a first agent request for the textual data associated with the first information source;

computer code to cause, in response to the second subscriber request, transmission of a second agent request for the video data associated with the second information source;

computer code to cause, in response to the third subscriber request, transmission of a third agent request for the audio data associated with the third information source;

computer code to allow, after the transmission of the first agent request, receipt of the textual data associated with the first information source;

computer code to allow, after the transmission of the second agent request, receipt of the video data associated with the second information source;

computer code to allow, after the transmission of the third agent request, receipt of the audio data associated with the third information source;

computer code to cause, in response the receipt of the textual data associated with the first information source, communication of the textual data associated with the first information source to more than one of the plurality of subscriber devices via a first plurality of multicast messages, wherein the computer program product is operable such that the textual data associated with the first information source is delivered in a manner based, at least in part, on at least one of the subscriber rules and at least a portion of the manager rules;

computer code to cause, in response to the receipt of the video data associated with the second information source, communication of the video data associated with the second information source to more than one of the plurality of subscriber devices via a second plurality of multicast messages, utilizing a first multicast group identification address, wherein the computer program product is operable such that the video data associated with the second information source is delivered in a manner based, at least in part, on at least one of the subscriber rules and at least a portion of the manager rules; and computer code to cause, in response to the audio data associated with the third information source, communication of the audio data associated with the third information source to more than one of the plurality of subscriber devices via a second plurality of multicast messages, utilizing a second multicast group identification address, wherein the computer program product is operable such that the audio data associated with the third information source is delivered in a manner based, at least in part, on at least one of the subscriber rules and at least a portion of the manager rules.

2. The computer program product of claim 1, and further comprising computer code for collecting information from a plurality of information providers.

3. The computer program product of claim 2, and further comprising computer code for packaging at least some of the collected information into customized bundles according to the received requests and the stored plurality of subscriber rules.

4. The computer program product of claim 3, wherein the computer program product is operable such that the packaging includes grouping information that satisfies the requests of multiple ones of the subscriber devices.

5. The computer program product of claim 3, wherein the computer program product is operable such that the packaging includes generating at least one of the first, the second, or the third plurality of multicast messages to include the customized bundles.

6. The computer program product of claim 2, wherein the computer program product is operable such that the collected information is provided via a plurality of networks.

7. The computer program product of claim 2, wherein the computer program product is operable such that the collected information is collected from the information sources by way of a broadcast.

8. The computer program product of claim 2, wherein the computer program product is operable such that one or more predetermined rules indicate a manner in which at least the portion of identified parts of the collected information common to the requests of a group of the subscriber devices is presented.

9. The computer program product of claim 2, wherein the computer program product is operable such that one or more predetermined rules cause at least one bundle of identified parts of the collected information common to the requests of a group of the subscriber devices to be delivered in an efficient or economical manner.

10. The computer program product of claim 2, wherein the computer program product is operable such that one or more predetermined rules specify whether to generate a bundle with a different amount of the collected information than at least one subscriber requested.

11. The computer program product of claim 2, wherein the computer program product is operable such that one or more predetermined rules specify a manner for delivering at least a portion of identified parts of the collected information.

12. The computer program product of claim 2, wherein the computer program product is operable such that one or more predetermined rules specify a manner for presenting at least a portion of identified parts of the collected information.

13. The computer program product of claim 2, wherein the computer program product is operable such that one or more predetermined rules dictate a manner in which at least a portion of identified parts of the collected information is bundled and presented via the subscriber devices.

14. The computer program product of claim 2, wherein the computer program product is operable such that one or more predetermined rules indicate an aspect of time at which at least a portion of identified parts of the collected information are to be delivered to the subscriber devices.

15. The computer program product of claim 2, wherein the computer program product is operable such that one or more predetermined rules indicate an interval at which at least a portion of identified parts of the collected information are to be delivered to the subscriber devices.

16. The computer program product of claim 2, wherein the computer program product is operable such that one or more predetermined rules indicate a form in which at least a portion of identified parts of the collected information are to be delivered to the subscriber devices.

17. The computer program product of claim 16, wherein the form includes an audio format.

18. The computer program product of claim 16, wherein the form includes a textual format.

19. The computer program product of claim 2, and further comprising computer code to cause at least some of the collected information to be packaged into customized bundles according to the received requests and one or more predetermined rules that are related to the form of the delivery of the information.

20. The computer program product of claim 2, and further comprising computer code to cause at least a portion of the collected information that satisfies the requests from multiple ones of the subscriber devices to be grouped.

21. The computer program product of claim 2, and further comprising: computer code to cause a list of available information services to be provided that are capable of supplying the requested different information, and computer code to cause receipt of a selection of one or more of the information services from the list.

22. The computer program product of claim 21, wherein the computer product is operable such that both multicast techniques and broadcast techniques are utilized.

23. The computer program product of claim 21, wherein the computer program product is operable such that at least a portion of the collected information is collected via a plurality of networks.

24. The computer program product of claim 2, wherein the computer program product is operable such that identified parts of the collected information comprise an entirety of the information collected from the plurality of subscriber devices.

25. The computer program product of claim 1, wherein the computer program product is operable such that the allowing receipt of the video data includes listening for broadcast streams from information providers that contain the requested different information.

26. The computer program product of claim 1, wherein the computer program product is operable such that the allowing receipt of the audio data includes listening for broadcast streams from information providers that contain the requested different information.

27. The computer program product of claim 1, wherein the computer program product is operable such that the requests are defined by an agent manager.

28. The computer program product of claim 1, wherein the computer program product is operable such that the requests are defined by subscribers.

29. The computer program product of claim 1, and further comprising computer code to cause the information sources to be contacted to request delivery of the requested different information.

30. The computer program product of claim 1, and further comprising computer code to cause a multicast group identification address to be obtained from at least one of the information sources.

31. The computer program product of claim 30, and further comprising computer code to cause listening for messages from the at least one of the information sources using the multicast group identification address.

32. The computer program product of claim 1, and further comprising computer code to cause listening for broadcast streams from the information sources that contain the requested different information.

33. The computer program product of claim 1, and further comprising computer code to cause multicasted information to be received from the information sources.

34. The computer program product of claim 1, wherein the computer program product is operable such that one or more predetermined rules include ground rules.

35. The computer program product of claim 1, wherein the computer program product is operable such that one or more predetermined rules indicate to form a union or intersection of requests to generate bundles.

36. The computer program product of claim 1, wherein the computer program product is operable such that one or more predetermined rules serve to generate bundles of optimal size that will satisfy the requests of several subscribers.

37. The computer program product of claim 1, wherein the computer program product is operable such that one or more predetermined rules are defined by an agent manager.

38. The computer program product of claim 37, wherein the computer program product is operable such that the agent manager includes an entity that establishes a set of ground rules for an agent.

39. The computer program product of claim 1, wherein the computer program product is operable such that one or more predetermined rules are defined by subscribers.

40. The computer program product of claim 1, wherein the computer program product is operable such that one or more predetermined rules indicate at least two of whether to complete a bundle, whether to fulfill partial orders, intervals at which bundles are to be delivered to the subscriber devices, and a form in which the bundles are to be delivered to the subscriber devices.

41. The computer program product of claim 1, wherein the computer program product is operable such that one or more predetermined rules indicate whether to complete a bundle.

42. The computer program product of claim 1, wherein the computer program product is operable such that one or more predetermined rules indicate whether to fulfill a partial order.

43. The computer program product of claim 1, and further comprising computer code to cause general delivery rules that pertain to all of the subscriber devices to be obtained.

44. The computer program product of claim 1, wherein the computer program product is operable such that one or more predetermined rules specify whether at least one subscriber wants at least one agent to complete a bundle.

45. The computer program product of claim 1, wherein the computer program product is operable such that one or more predetermined rules indicate at least three of: whether to complete a bundle, whether to fulfill partial orders, intervals at which bundles are to be delivered to the subscriber devices, and a form in which the bundles are to be delivered to the subscriber devices.

46. The computer program product of claim 1, wherein the computer program product is operable such that at least one of the first, the second, or the third plurality of multicast messages is communicated to the subscriber devices using Internet protocol multicasting.

47. The computer program product of claim 1, wherein the computer program product is operable such that the communication of at least one of the first, the second, or the third plurality of multicast messages includes taking advantage of multicast routing protocols.

48. The computer program product of claim 1, wherein the computer program product is operable such that the communication of at least one of the first, the second, or the third plurality of multicast messages uses Internet multicast group addresses.

49. The computer program product of claim 1, wherein the computer program product is operable such that the communication of at least one of the first, the second, or the third plurality of multicast messages includes taking advantage of Internet protocol multicast routing techniques.

50. The computer program product of claim 1, wherein the computer program product is operable such that at least one of the first, the second, or the third plurality of multicast messages includes a customized bundle.

51. The computer program product of claim 1, wherein the computer product is operable such that both multicast techniques and broadcast techniques are utilized.

52. The computer program product of claim 1, wherein at least one agent is included.

53. The computer program product of claim 52, wherein the at least one agent includes at least one of: the computer code to allow receipt, the computer code to cause transmission, or the computer code to cause communication.

54. The computer program product of claim 52, wherein the at least one agent includes the computer code to allow receipt, the computer code to cause transmission, and the computer code to cause communication.

55. The computer program product of claim 52, wherein the computer program product is operable such that the at least one agent is coupled to the subscriber devices via at least one network.

56. The computer program product of claim 55, wherein the computer program product is operable such that the at least one network that couples the at least one agent and the subscriber devices includes the Internet.

57. The computer program product of claim 55, wherein the computer program product is operable such that the at least one network that couples the at least one agent and the subscriber devices includes at least one of a metropolitan area network (MAN), a local area network (LAN), or a public telephone network.

58. The computer program product of claim 52, wherein the computer program product is operable such that the at least one agent is coupled to the subscriber devices via a plurality of networks.

59. The computer program product of claim 52, wherein the computer program product is operable such that the at least one agent is coupled to the information sources via at least one network.

60. The computer program product of claim 59, wherein the at least one network includes the Internet.

61. The computer program product of claim 59, wherein the at least one network includes at least one of a metropolitan area network (MAN), a local area network (LAN), or a public telephone network.

62. The computer program product of claim 59, wherein the at least one network includes a wireless network.

63. The computer program product of claim 52, wherein the computer program product is operable such that the at least one agent is coupled to the information sources via a plurality of networks.

64. The computer program product of claim 52, wherein the computer program product is operable such that the at least one agent includes an entity with functions that are distributed over several devices.

65. The computer program product of claim 64, wherein the computer program product is operable such that the entity includes a virtual entity.

66. The computer program product of claim 52, wherein the computer program product is operable such that the at least one agent is implemented as software within a single device.

67. The computer program product of claim 52, wherein the computer program product is operable such that the at least one agent includes a subscriber database.

68. The computer program product of claim 52, wherein the computer program product is operable such that the at least one agent interfaces an external subscriber database.

69. The computer program product of claim 1, wherein a subscriber database is included.

70. The computer program product of claim 69, wherein the subscriber database includes a plurality of entries including a subscriber identifier field, a requests field, and a rules field.

71. The computer program product of claim 69, wherein the subscriber database includes a plurality of entries including a subscriber identifier field.

72. The computer program product of claim 71, wherein the computer program product is operable such that the subscriber identifier field stores a unique identifier for a particular subscriber or group of subscribers.

73. The computer program product of claim 71, wherein the computer program product is operable such that the subscriber identifier field stores a unique identifier for a group of subscribers.

74. The computer program product of claim 69, wherein the subscriber database includes a plurality of entries including a requests field.

75. The computer program product of claim 74, wherein the computer program product is operable such that the requests field indicates the requested different information that a subscriber desires.

76. The computer program product of claim 1, wherein the computer program product is operable such that one or more predetermined rules are defined by an agent manager that is a person.

77. The computer program product of claim 1, wherein the computer program product is operable such that one or more predetermined rules are defined by an agent manager that is a system.

78. The computer program product of claim 69, wherein the computer program product is operable such that the subscriber database controls bundling.

79. The computer program product of claim 1, and further comprising computer code to cause receipt of a contact from a new subscriber to be registered.

80. The computer program product of claim 79, and further comprising computer code to cause generation of a subscriber identifier for the new subscriber.

81. The computer program product of claim 80, wherein the computer program product is operable such that the subscriber identifier is automatically generated using a numeric or alphanumeric identifier for the new subscriber.

82. The computer program product of claim 1, and further comprising computer code to cause a new subscriber to be prompted for information that the new subscriber desires to receive.

83. The computer program product of claim 82, wherein the computer program product is operable such that the new subscriber is presented with a list of available information services, and the new subscriber is permitted to select from the list of available information services.

84. The computer program product of claim 83, and further comprising computer code to cause receipt of a request notification from the new subscriber indicating the information services that the new subscriber desires.

85. The computer program product of claim 82, and further comprising computer code to cause the new subscriber to be prompted for rules that are related to the form of the delivery of the information.

86. The computer program product of claim 82, and further comprising computer code to cause operation such that, if a new subscriber requests information that an agent does not already obtain for another subscriber, the agent identifies the information source that provides the requested information.

87. The computer program product of claim 1, and further comprising computer code to cause extraneous information received in at least one of the first, the second, or the third plurality of multicast messages to be discarded.

88. The computer program product of claim 1, wherein the computer program product is operable such that one or more predetermined rules specify whether to form a union of requests.

89. The computer program product of claim 1, wherein the computer program product is operable such that one or more predetermined rules specify whether to form an intersection of requests.

90. The computer program product of claim 1, wherein the non-transitory computer readable medium comprises a single storage device.

91. The computer program product of claim 1, wherein the non-transitory computer readable medium comprises a plurality of storage devices.

92. The computer program product of claim 91, wherein the plurality of storage devices are geographically distributed in a network.

93. A computer program product embodied on a non-transitory computer- readable medium for delivering information, comprising:
　　computer code to allow access to a plurality of information services that are capable of supplying different information;
　　computer code to allow receipt of requests for different messages associated with different ones of the information services from a plurality of subscriber devices;
　　computer code to allow receipt of a first subscriber-related request for a first plurality of messages associated with first content data associated with a first information source, from at least one of the plurality of subscriber devices;
　　computer code to allow receipt of a second subscriber-related request for a second plurality of messages associated with second content data associated with a second information source, from at least one of the plurality of subscriber devices;
　　computer code to allow receipt of a third subscriber-related request for a third plurality of messages associated with third content data associated with a third information source, from at least one of the plurality of subscriber devices;
　　computer code to allow receipt of a fourth subscriber-related request for a fourth plurality of messages associated with textual data associated with a fourth information source, from at least one of the plurality of subscriber devices, the textual data including at least one of stock quote information, weather information, or sports information;
　　computer code to allow receipt of a fifth subscriber-related request for a fifth plurality of messages associated with audio data associated with a fifth information source, from at least one of the plurality of subscriber devices;
　　computer code to cause storage of:
　　the first subscriber-related request;
　　the second subscriber-related request;
　　the third subscriber-related request;
　　the fourth subscriber-related request;
　　the fifth subscriber-related request; and
　　one or more manager rules that is related to an optimization of a satisfaction of multiple requests from more than one of the plurality of subscriber devices;
　　computer code to cause, in response to the first subscriber-related request, transmission of a first agent request for the first content data associated with the first information source;
　　computer code to cause, in response to the second subscriber-related request, transmission of a second agent request for the second content data associated with the second information source;
　　computer code to cause, in response to the third subscriber-related request, transmission of a third agent request for the third content data associated with the third information source;

computer code to cause, in response to the fourth subscriber-related request, transmission of a fourth agent request for the textual data associated with the fourth information source;

computer code to cause, in response to the fifth subscriber-related request, transmission of a fifth agent request for the audio data associated with the fifth information source;

computer code to allow, after the transmission of the first agent request, receipt of the first content data associated with the first information source;

computer code to allow, after the transmission of the second agent request, receipt of the second content data associated with the second information source;

computer code to allow, after the transmission of the third agent request, receipt of the third content data associated with the third information source;

computer code to allow, after the transmission of the fourth agent request, receipt of the textual data associated with the fourth information source;

computer code to allow, after the transmission of the fifth agent request, receipt of the audio data associated with the fifth information source;

computer code to cause, after the receipt of the first content data associated with the first information source, communication of the first content data associated with the first information source to more than one of the plurality of subscriber devices via a first plurality of multicast messages, utilizing a first multicast group identification address, wherein the computer program product is operable such that the first content data associated with the first information source is delivered in a manner based, at least in part, on at least one of the one or more manager rules;

computer code to cause, after the receipt of the second content data associated with the second information source, communication of the second content data associated with the second information source to more than one of the plurality of subscriber devices via a second plurality of multicast messages, utilizing a second multicast group identification address, wherein the computer program product is operable such that the second content data associated with the second information source is delivered in a manner based, at least in part, on at least one of the one or more manager rules;

computer code to cause, after the receipt of the third content data associated with the third information source, communication of the third content data associated with the third information source to more than one of the plurality of subscriber devices via a third plurality of multicast messages, utilizing a third multicast group identification address, wherein the computer program product is operable such that the third content data associated with the third information source is delivered in a manner based, at least in part, on at least one of the one or more manager rules;

computer code to cause, after the receipt of the textual data associated with the fourth information source, communication of the textual data associated with the fourth information source to at least one of the plurality of subscriber devices; and computer code to cause, after the receipt of the audio data associated with the fifth information source, communication of the audio data associated with the fifth information source to at least one of the plurality of subscriber devices.

94. The computer program product of claim 93, wherein the computer code to cause storage of: the first subscriber-related request; the second subscriber-related request; the third subscriber-related request; the fourth subscriber-related request; the fifth subscriber-related request; and the one or more manager rules, causes storage thereof in a memory of an agent.

95. The computer program product of claim 93, wherein the computer code to cause storage of: the first subscriber-related request; the second subscriber-related request; the third subscriber-related request; the fourth subscriber-related request; the fifth subscriber-related request; and the one or more manager rules, causes storage thereof in a memory external to and accessible by an agent.

96. The computer program product of claim 93, wherein the computer program product is operable such that the information services are provided by information providers.

97. The computer program product of claim 93, wherein the computer program product is operable such that the information services are provided by information providers that supply information to whomever wants the information.

98. The computer program product of claim 93, wherein the computer program product is operable such that the information services are provided by information providers that subscribes to the information services.

99. The computer program product of claim 93, wherein the first content data, the second content data, and the third content data include different video.

100. A system, comprising:
at least one network device operable to:
allow access to a plurality of information services that are capable of supplying different information;
allow receipt of requests for different messages associated with different ones of the information services from a plurality of subscriber devices;
allow receipt of a first subscriber-related request for a first plurality of messages associated with first content data associated with a first information source, from at least one of the plurality of subscriber devices;
allow receipt of a second subscriber-related request for a second plurality of messages associated with second content data associated with a second information source, from at least one of the plurality of subscriber devices;
allow receipt of a third subscriber-related request for a third plurality of messages associated with third content data associated with a third information source, from at least one of the plurality of subscriber devices;
allow receipt of a fourth subscriber-related request for a fourth plurality of messages associated with textual data associated with a fourth information source, from at least one of the plurality of subscriber devices, the textual data including at least one of stock quote information, weather information, or sports information;
allow receipt of a fifth subscriber-related request for a fifth plurality of messages associated with audio data associated with a fifth information source, from at least one of the plurality of subscriber devices;
cause storage of:
the first subscriber-related request;
the second subscriber-related request;
the third subscriber-related request;
the fourth subscriber-related request;
the fifth subscriber-related request; and one or more manager rules that is related to an optimization of a satisfaction of multiple requests from more than one of the plurality of subscriber devices;

cause, in response to the first subscriber-related request, transmission of a first agent request for the first content data associated with the first information source;

cause, in response to the second subscriber-related request, transmission of a second agent request for the second content data associated with the second information source;

cause, in response to the third subscriber-related request, transmission of a third agent request for the third content data associated with the third information source;

cause, in response to the fourth subscriber-related request, transmission of a fourth agent request for the textual data associated with the fourth information source;

cause, in response to the fifth subscriber-related request, transmission of a fifth agent request for the audio data associated with the fifth information source;

allow, after the transmission of the first agent request, receipt of the first content data associated with the first information source;

allow, after the transmission of the second agent request, receipt of the second content data associated with the second information source;

allow, after the transmission of the third agent request, receipt of the third content data associated with the third information source;

allow, after the transmission of the fourth agent request, receipt of the textual data associated with the fourth information source;

allow, after the transmission of the fifth agent request, receipt of the audio data associated with the fifth information source;

cause, after the receipt of the first content data associated with the first information source, communication of the first content data associated with the first information source to more than one of the plurality of subscriber devices via a first plurality of multicast messages, utilizing a first multicast-related message, wherein the system is operable such that the first content data associated with the first information source is delivered in a manner based, at least in part, on at least one of the one or more manager rules;

cause, after the receipt of the second content data associated with the second information source, communication of the second content data associated with the second information source to more than one of the plurality of subscriber devices via a second plurality of multicast messages, utilizing a second multicast-related message, wherein the system is operable such that the second content data associated with the second information source is delivered in a manner based, at least in part, on at least one of the one or more manager rules;

cause, after the receipt of the third content data associated with the third information source, communication of the third content data associated with the third information source to more than one of the plurality of subscriber devices via a third plurality of multicast messages, utilizing a third multicast-related message, wherein the system is operable such that the third content data associated with the third information source is delivered in a manner based, at least in part, on at least one of the one or more manager rules;

cause, after the receipt of the textual data associated with the fourth information source, communication of the textual data associated with the fourth information source to at least one of the plurality of subscriber devices; and cause, after the receipt of the audio data associated with the fifth information source, communication of the audio data associated with the fifth information source to at least one of the plurality of subscriber devices.

* * * * *